(12) United States Patent
Hegmann

(10) Patent No.: US 7,059,610 B2
(45) Date of Patent: Jun. 13, 2006

(54) MULTI-LAYER GASKET AND METHOD FOR CONNECTING THE LAYERS OF A MULTI-LAYER GASKET

(75) Inventor: Oliver Hegmann, Ginsheim (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 10/419,648

(22) Filed: Apr. 21, 2003

(65) Prior Publication Data
US 2004/0046332 A1 Mar. 11, 2004

(30) Foreign Application Priority Data
Aug. 16, 2002 (DE) .............................. 102 37 555

(51) Int. Cl.
*F02F 11/00* (2006.01)
(52) U.S. Cl. .................................... 277/598
(58) Field of Classification Search ......... 277/591–598
See application file for complete search history.

(56) References Cited

U.S. PATENT DOCUMENTS

| | | | | |
|---|---|---|---|---|
| 2,135,807 | A | * | 11/1938 | Fitzgerald .................. 428/591 |
| 5,979,905 | A | * | 11/1999 | Fischer et al. .............. 277/591 |
| 6,179,298 | B1 | * | 1/2001 | Schweiger ................. 277/598 |
| 6,283,480 | B1 | * | 9/2001 | Miura et al. ............... 277/593 |

FOREIGN PATENT DOCUMENTS

| | | |
|---|---|---|
| DE | 198 23 115 C | 9/1999 |
| DE | 198 22 772 A | 12/1999 |

OTHER PUBLICATIONS

Hildebrand, S. "Feinmechanische Banelemente", C-Hanser Verlag, Munich 1972, pp. 210-211 and English Translation.

* cited by examiner

*Primary Examiner*—Jong-Suk (James) Lee
*Assistant Examiner*—Vishal Patel

(57) ABSTRACT

In order to produce a multi-layer gasket which comprises at least one first layer and one second layer and at least one connecting arrangement for connecting the layers of the gasket together wherein the layers of the gasket are connected together in a simple and reliable manner, it is proposed that the connecting arrangement should comprise at least one retaining element connected to the first layer and at least one through opening arranged in the second layer, wherein the retaining element and a retention area of the second layer partially overlap one another in an unconnected state of the layers, wherein, for the purposes of connecting the layers, the retaining element is deformable from the plane of the first layer and can be moved past the retention area, and wherein the retaining element grips behind the retention area of the second layer in a connected state of the layers in such a manner that the first layer and the second layer are safeguarded from a separating movement of the layers.

40 Claims, 15 Drawing Sheets

MULTI-LAYER GASKET AND METHOD FOR CONNECTING THE LAYERS OF A MULTI-LAYER GASKET

Figure 1:
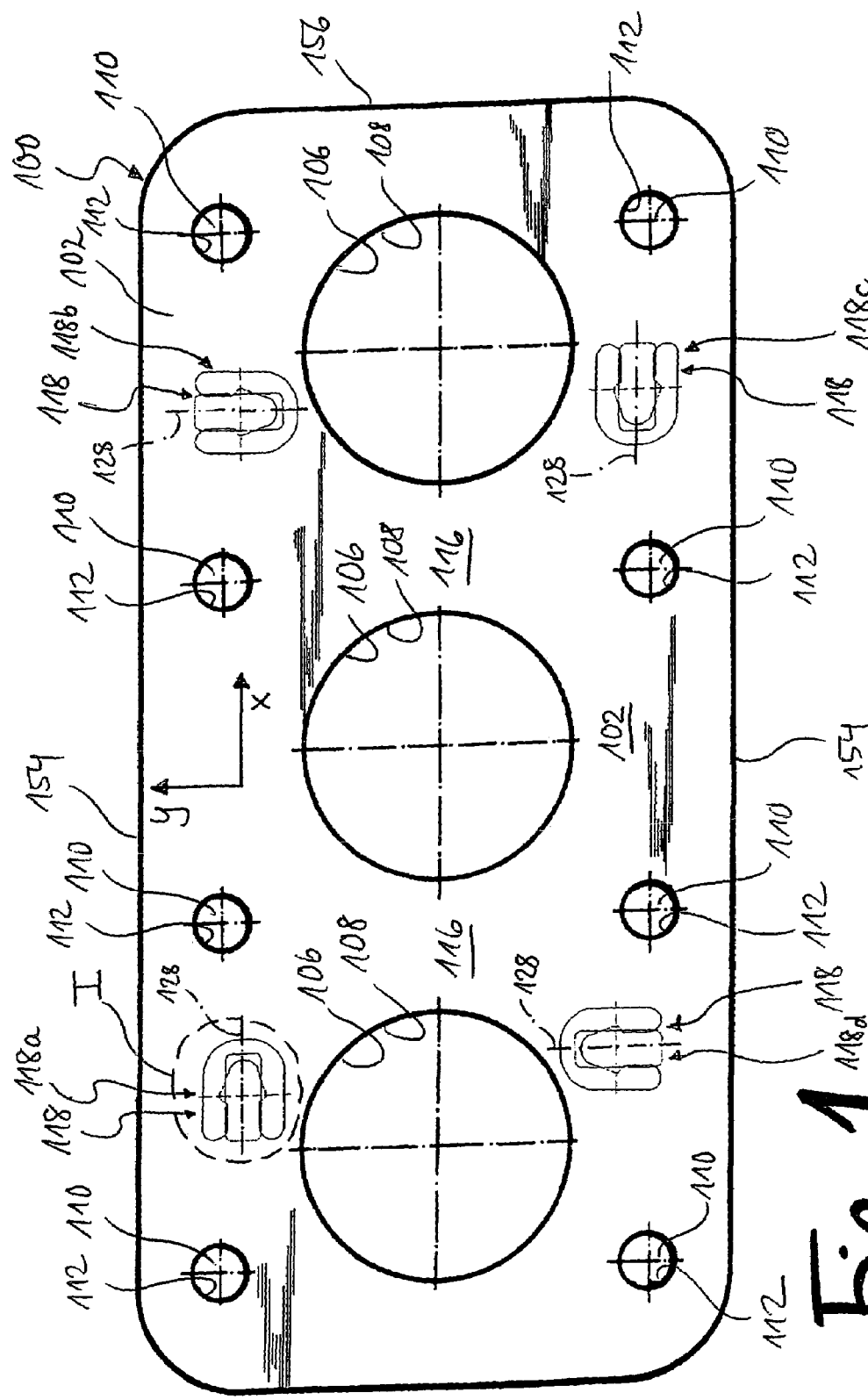

The present disclosure relates to the subject matter disclosed in and claims priority of German Patent Application No. 102 37 555.0 of Aug. 16, 2002, the entire specification of which is incorporated herein by reference.

The present invention relates to a multi-layer gasket which comprises at least one first layer and one second layer and at least one connecting arrangement for connecting the layers of the gasket together.

Furthermore, the present invention comprises a method for connecting together the layers of a multi-layer gasket which comprises at least one first layer and one second layer.

Such multi-layer gaskets and methods for connecting the layers of a multi-layer gasket together are known from the state of the art.

In particular, it is known to connect the layers of a multi-layer gasket together by means of riveting or penetration jointing techniques.

However, in the case of connecting methods of this type, there is a spread of material in a direction perpendicular to the main surfaces of the gasket which occurs when the connection is being produced so that the connecting arrangements produced by riveting or penetrating jointing techniques must be arranged outside the compressed area of the gasket. Additional tongues frequently need to be provided on the layers of the gasket outside the compressed area of the gasket in order to enable the connecting arrangements to be accommodated in the vicinity of these tongues, which may thus lead to an increase in the amount of material used and to the danger of injuries being caused by the projecting tongues.

Furthermore, it is known to connect the layers of a multi-layer gasket together by means of crimping techniques. In the case of this type of connection too, there is either a resultant spread of material perpendicular to the main surfaces of the gasket and/or additional tongues need to be provided at the edge of the gasket layers.

Furthermore, it is known to connect the layers of a multi-layer gasket together by means of welding techniques. However, this form of connection cannot be used if the layers of the gasket are coated with an elastomer for example because the coating would be destroyed by the welding process. Moreover, it is not possible, or it leads to unreliable results, if one or more of the layers of the gasket are formed by non-metals.

Consequently, the object of the present invention is to provide a multi-layer gasket of the type mentioned hereinabove wherein the layers of the gasket are connected together in a simple and reliable manner.

In accordance with the invention, this object is achieved in the case of a gasket incorporating the features of the preamble of claim 1 in that the connecting arrangement comprises at least one retaining element connected to the first layer and at least one through opening arranged in the second layer, wherein the retaining element and a retention area of the second layer partially overlap one another in the unconnected state of the layers, wherein, for the purposes of connecting the layers, the retaining element is deformable from the plane of the first layer and can be moved past the retention area, and wherein, in a connected state of the layers, the retaining element grips behind the retention area of the second layer in such a manner that the first layer and the second layer are safeguarded from a separating movement of the layers.

Thus, the concept underlying the invention in accordance with the invention is that a retaining element, which is formed in the first layer by stamping out at least one through opening for example, be deformed from the plane of the first layer in such a manner that it will engage from behind a retention area of the second layer such that the first layer and the second layer are then safeguarded against a separating movement of the layers by virtue of their interlocking arrangement. Hereby, the retaining element is moved past the retention area in the course of its deformation, whereby the retaining element and the retention area were already partially overlapping prior to the movement of the retaining element past the retention area. This offers the advantage that, even prior to its movement past the retention area, the retaining element already comprises the undercuts which will prevent a return movement of the retaining element, and hence the release of the layers from each other, after it has been moved past the retention area, and that there is no need to wait until after its movement past the retention area before these undercuts can be formed.

Following the movement of the retaining element past the retention area, the retention area will prevent the retaining element from returning into the plane of the first layer so that the two layers are connected together in a simple and reliable manner.

Hereby, the multi-layer gasket may comprise, apart from the first layer and the second layer, an arbitrary number of further layers which are preferably arranged between the first layer and the second layer.

The solution in accordance with the invention offers the advantage that a welding process is not required for producing the connection so that the connecting arrangement in accordance with the invention can also be employed especially in the case where one or more layers of the gasket are provided with a coating on one or both sides thereof.

In a special embodiment of the invention, provision is made for the retaining element to comprise at least one overlapping area which overlaps the retention area in the unconnected state of the layers and deforms during the movement of the retaining element past the retention area in such a manner that the retaining element is capable of being moved past the retention area.

Preferably, the deformation of the overlapping area occurs in an at least partially elastic manner so that the overlapping area, which has deformed from the plane of the remaining parts of the retaining element during the movement of the retaining element past the retention area, will return to its original position relative to the remaining parts of the retaining element after the movement thereof past the retention area so that the overlapping area will again overlap the retention area following the movement of the retaining element past the retention area without the overlapping area having to be deformed by an external force after the movement of the retaining element past the retention area.

In order to achieve a particularly secure and reliable interconnection of the layers of the gasket, it is advantageous if the retaining element comprises at least two mutually spaced overlapping areas.

In particular, provision may be made for the overlapping area to be in the form of a projection at the edge of the retaining element.

As an alternative or in addition to the presence of an overlapping area on the retaining element, provision may be made for the retention area to comprise at least one overlapping area which overlaps the retaining element in the unconnected state of the layers and which deforms during the movement of the retaining element past the retention area in such a manner that the retaining element is capable of being moved past the retention area.

Preferably, the deformation of the overlapping area provided on the retention are also occurs in an at least partially elastic manner so that, following the movement of the retaining element past the retention area, the overlapping area is deformed back into an overlapping position in which the overlapping area overlaps the retaining element so that the areas of the retaining element overlapped by the overlapping area engage from behind the overlapping area in such a manner that the first layer and the second layer are safeguarded against a separating movement of the layers.

In order to achieve a particularly secure and reliable interconnection of the layers of the gasket, it is advantageous if the second layer comprises at least two mutually spaced retention areas each having at least one overlapping area.

In particular, provision may be made for the overlapping area to be in the form of a projection at the edge of the through opening in the second layer.

If the connecting arrangement comprises a plurality of overlapping areas at which areas of the retaining element and the second layer overlap, then these overlapping areas can be formed and arranged substantially symmetrically relative to a longitudinal axis of the connecting arrangement.

As an alternative or in addition thereto, provision may also be made for the connecting arrangement to comprise a plurality of such overlapping areas which are mutually displaced along the longitudinal axis of the connecting arrangement.

More detailed statements have not as yet been made in regard to the design of the retaining element.

Thus, in one embodiment of the invention, provision is made for the retaining element to be in the form of a retaining tongue which is connected at one end to the first layer.

In particular, provision may be made for the retaining tongue to taper towards a tip thereof. This offers the advantage that the tapering portion of the retaining tongue is easily insertible into the through opening in the second layer and is movable through the latter.

As an alternative thereto, provision could also be made for the retaining element to be in the form of a retaining web which is connected at both ends to the first layer.

A retaining element which is particularly easy to manufacture is one which is formed in one piece with the first layer.

A retaining element which is particularly easy to manufacture is one which is formed by producing, especially by means of a stamping-out or cutting-out process, at least one through opening in the first layer.

In order to enable the layers of the gasket to be precisely positioned relative to one another in directions that are parallel to the main surfaces of the gasket layers, provision is advantageously made, in the connected state of the layers, for the edge of the retaining element and the edge of the through opening in the second layer to be spaced apart at the point at which the retaining element penetrates the through opening by a distance which is less than approximately 1 millimeter, and is preferably less than approximately 0.5 millimeter.

In order to enable the layers of the gasket to be precisely positioned relative to one another in two different directions that extend in parallel relative to the main surfaces of the gasket layers, provision is made in one preferred embodiment of the invention for the gasket to comprise at least two connecting arrangements, wherein, in the case of the first connecting arrangement, the edge of the retaining element extends in a first edge direction at the point whereat the retaining element penetrates the through opening in the second layer, wherein, in the case of the second connecting arrangement, the edge of the retaining element extends in a second edge direction at the point whereat the retaining element penetrates the through opening in the second layer, and wherein the first edge direction and the second edge direction are mutually rotated.

It is particularly expedient if the first edge direction and the second edge direction are mutually rotated through an angle of at least approximately 45°, preferably through an angle of at least 60° and especially through an angle of approximately 90°.

Provision is preferably made for the retaining element to be deformed out of the plane of the first layer into the plane of the second layer.

In regard to the arrangement of the retention area, it is particularly expedient if the retention area of the second layer is deformed from the plane of the second layer into the plane of the first layer, or, into the plane of a layer of the gasket that is arranged between the first layer and the second layer in the event that the gasket comprises at least one further layer in addition to the first layer and the second layer.

In order to prevent the deformation of the retaining element leading to a spreading of the material in the vicinity of the connecting arrangement, it is advantageous if a surface of the retaining element is substantially flush with an edge surface of the gasket in the assembled state of the gasket, for example, flush with a lower face of the second layer of the gasket.

In order to prevent any deformation of the retention area leading to a spreading of the material in the vicinity of the connecting arrangement, it is advantageous if a surface of the retention area is substantially flush with an edge surface of the gasket in the assembled state of the gasket, for example, flush with an upper face of the first layer of the gasket.

In a preferred embodiment of the gasket, provision is made for the connecting arrangement to be arranged in a region of the gasket which is compressed in the assembled state of the gasket.

This becomes possible, especially if the connecting arrangement is designed in such a manner that it does not cause material to spread beyond the edge surfaces of the gasket.

The location of the connecting arrangement in the compressed region of the gasket enables the use of additional clamps, which would otherwise be provided for lining up the connecting arrangements, to be dispensed with on the outer contour of the gasket. In turn, this leads to an arrangement in which the outer contours of the gasket do not project beyond the components requiring sealing so that the module formed by the gasket and the components requiring sealing has a more pleasing appearance.

Moreover, this arrangement removes the danger of injuries being caused by the outer contours of the gasket projecting beyond the components requiring sealing.

Furthermore, the present invention relates to a method of connecting together the layers of a multi-layer gasket which comprises at least one first layer and second layer, said method comprising the following method steps:

at least one retaining element connected to the first layer and at least one through opening in the second layer are formed, wherein the retaining element and a retention area adjoining the through opening in the second layer partially overlap one another in the unconnected state of the layers;

the retaining element is deformed from the plane of the first layer in such a manner that it is moved past the retention area, and, after this passing movement, it grips behind the retention area in such a manner that the first layer and the second layer are safeguarded from a separating movement of the layers.

Due to the method in accordance with the invention, the layers of the multi-layer gasket are connected together in a simple and reliable manner without a welding process being required therefor and without necessitating the formation of a spread of material in the vicinity of the connecting arrangement which is producing the connection of the layers.

Particular embodiments of the method in accordance with the invention form the subject matter of the dependent claims 22 to 40, the advantages thereof having already been explained hereinabove in connection with the particular embodiments of the gasket in accordance with the invention.

Further features and advantages of the invention form the subject matter of the subsequent description and the sketched illustration of embodiments thereof.

Figure 2:
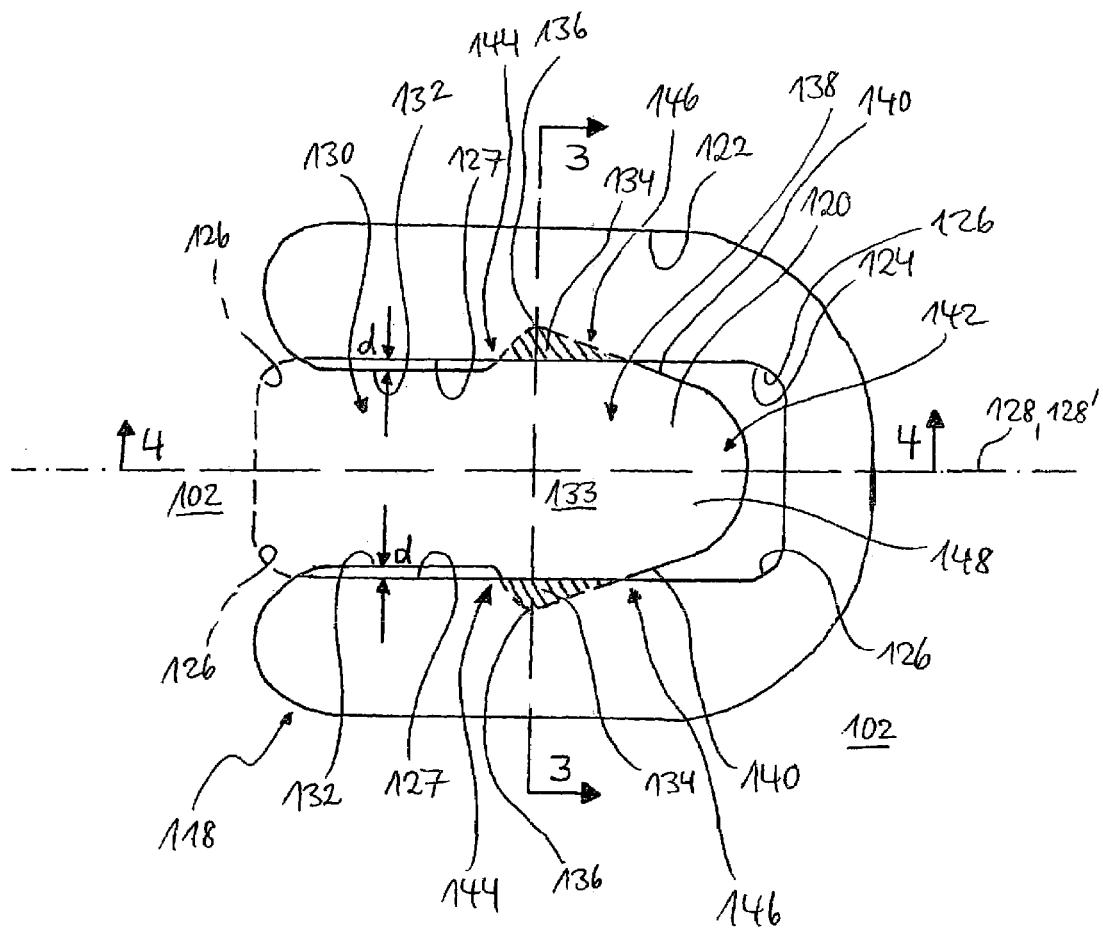
Figure 3:
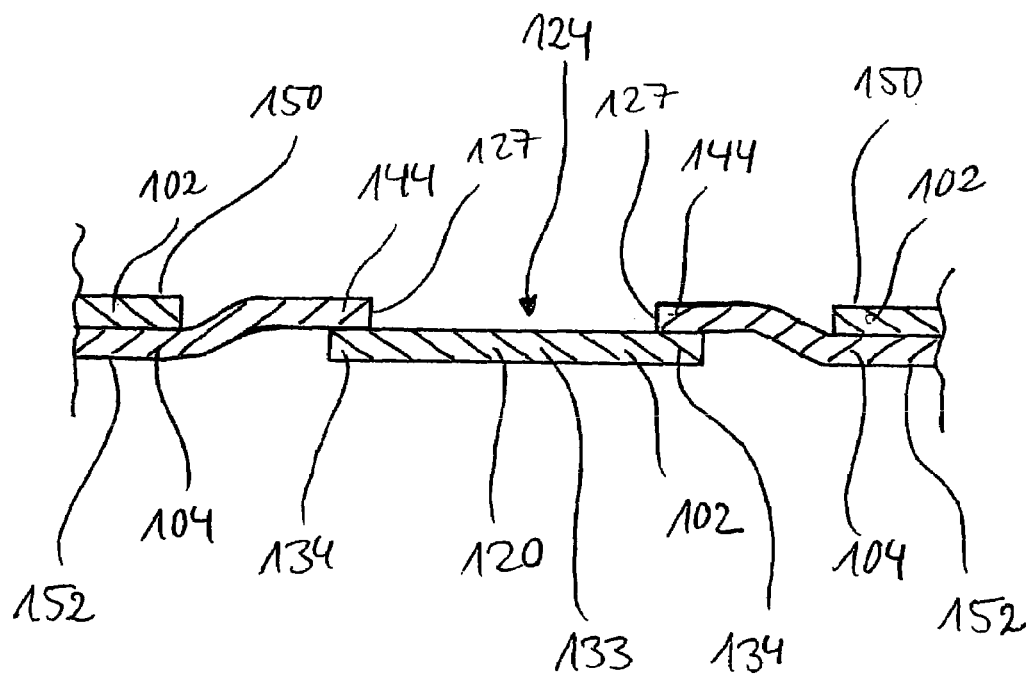
Figure 4:
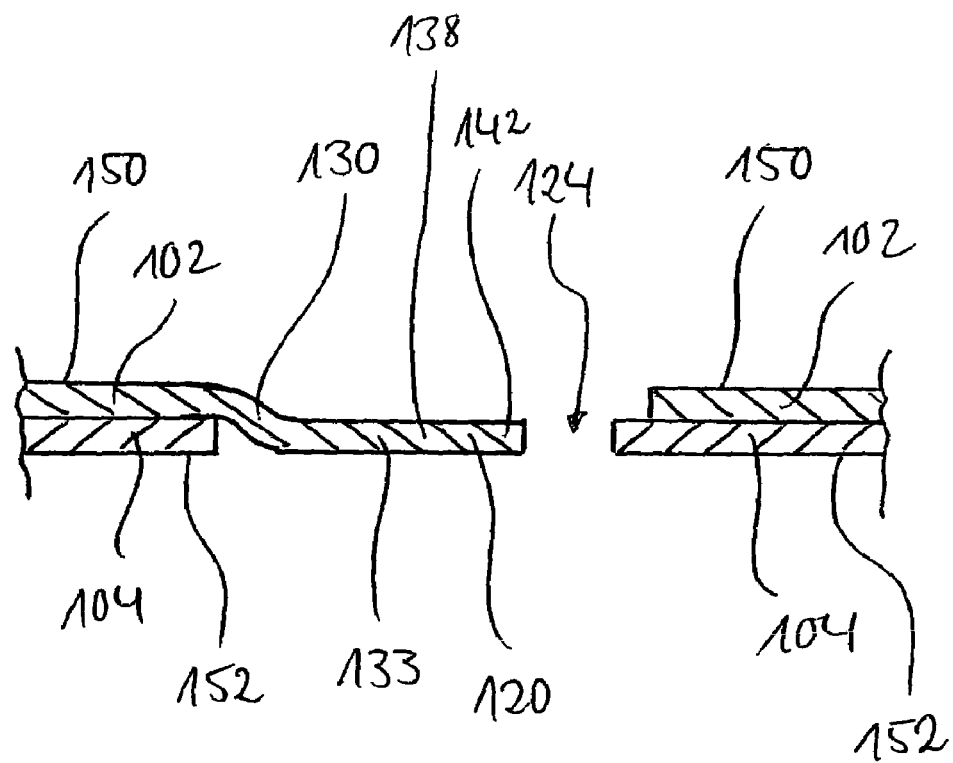
Figure 5:
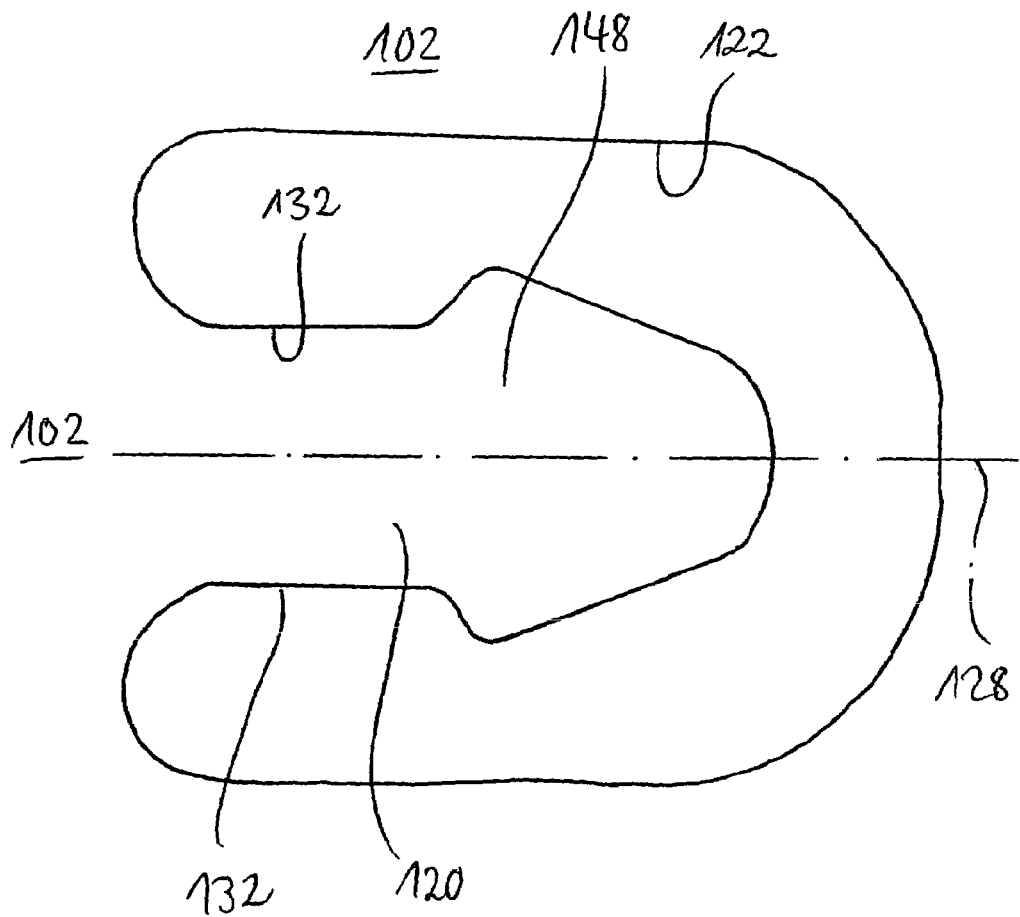
Figure 6:
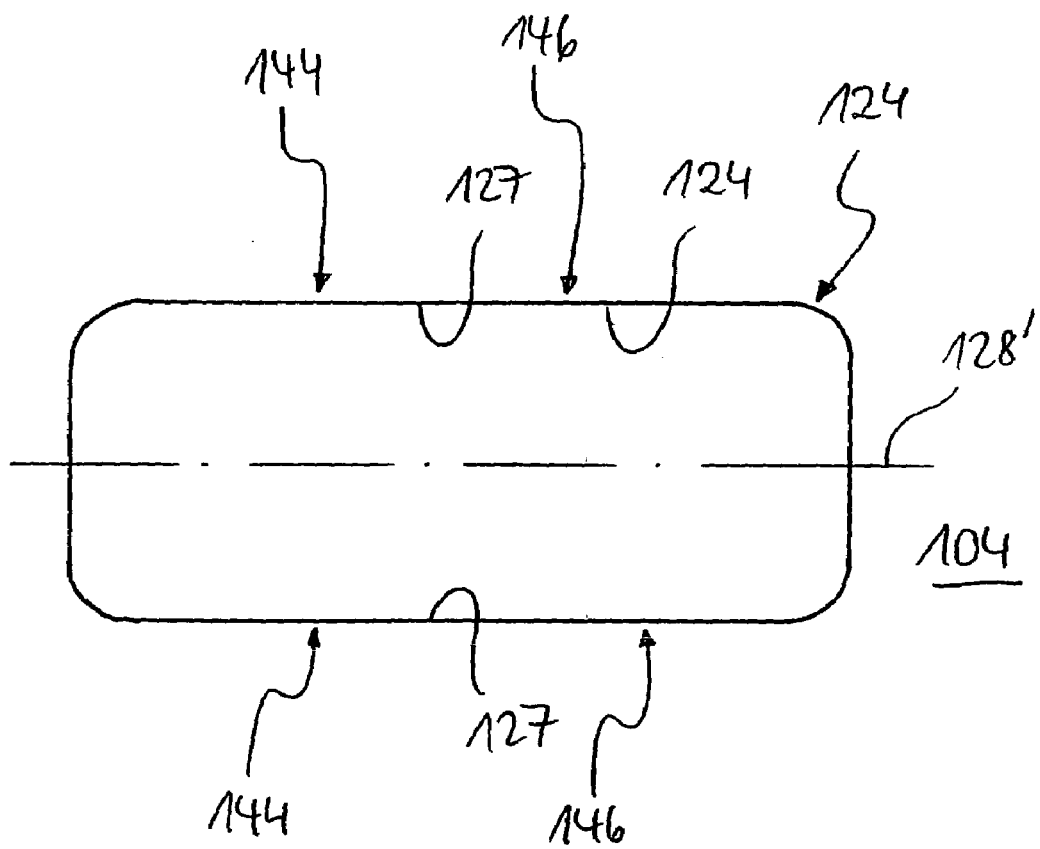
Figure 7:
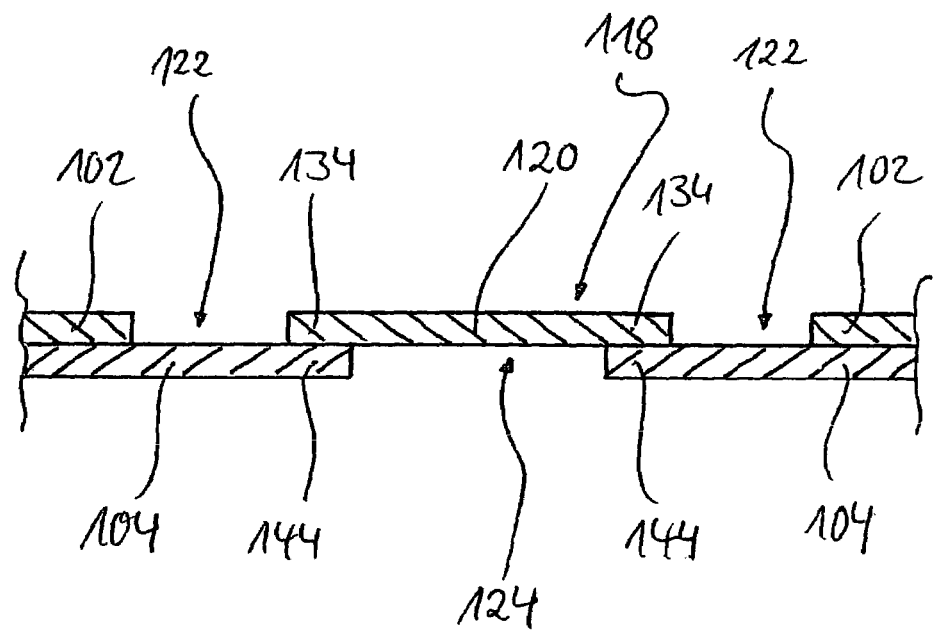
Figure 8:
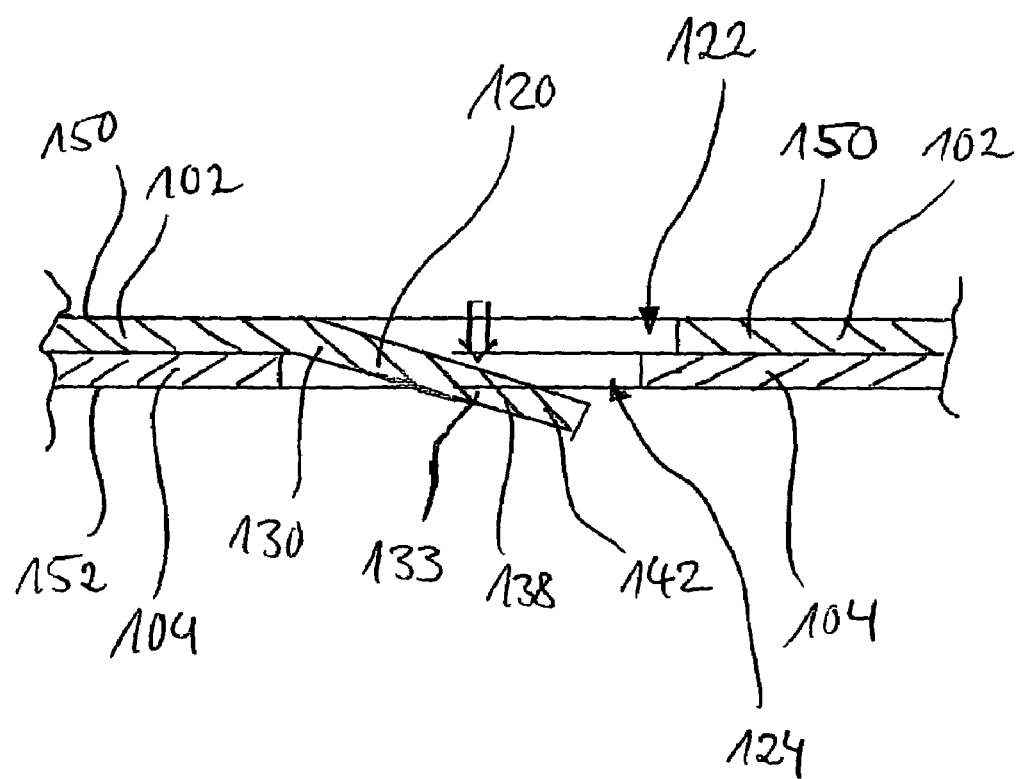
Figure 9:
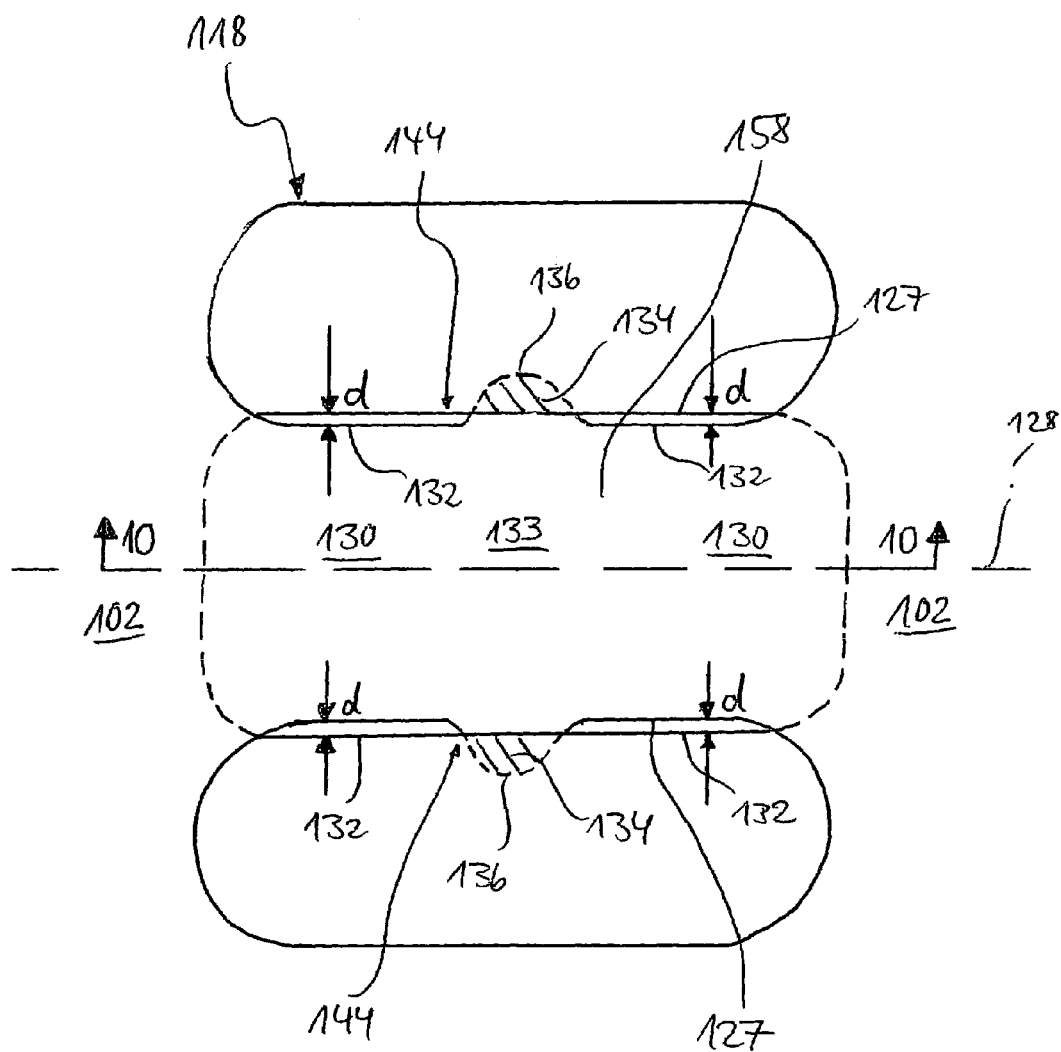
Figure 10:
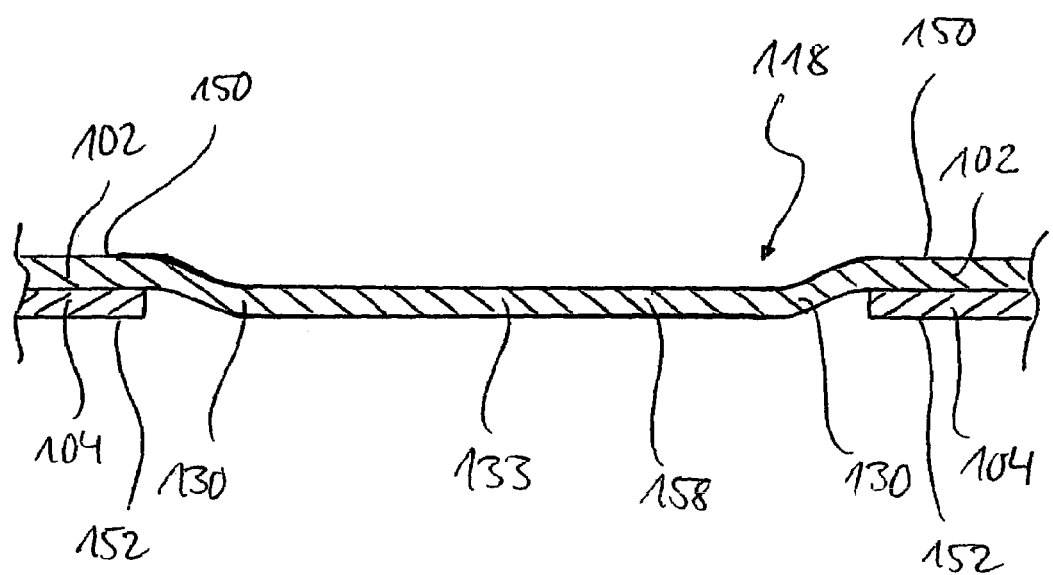
Figure 11:
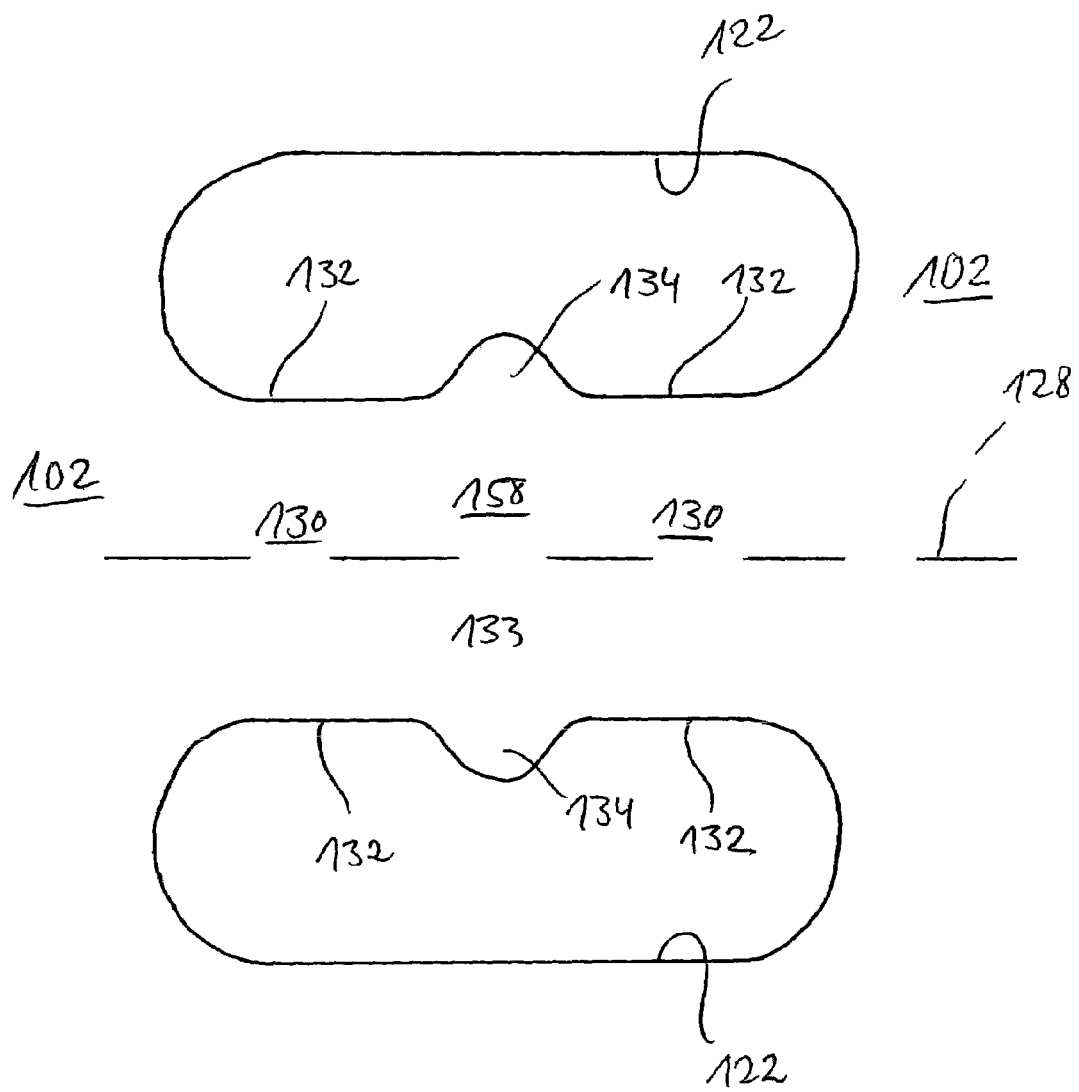
Figure 12:
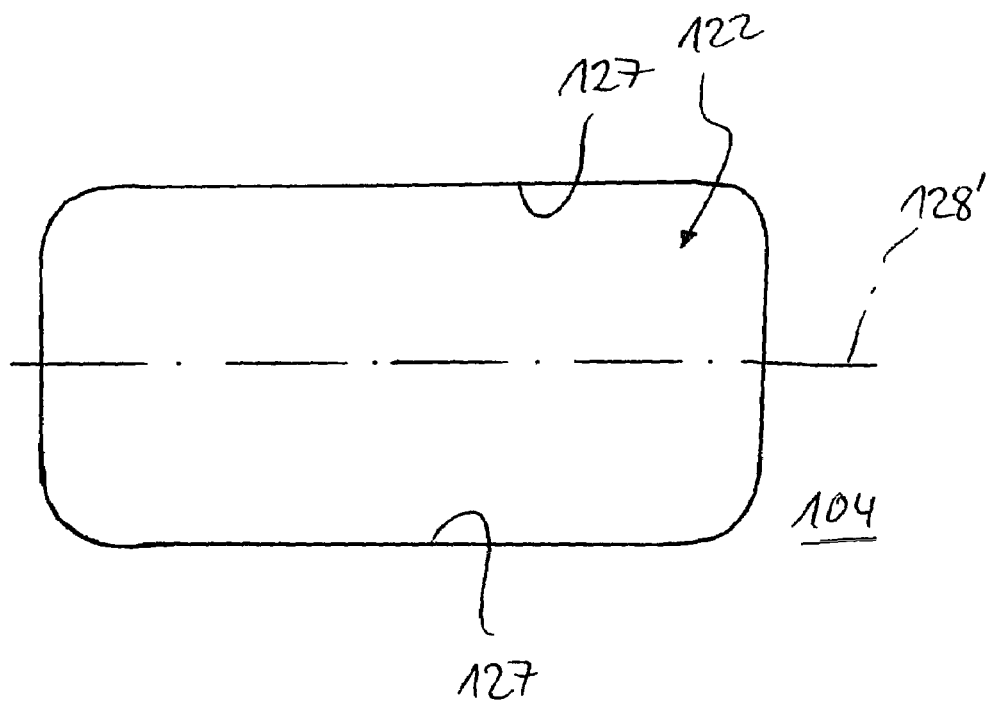
Figure 13:
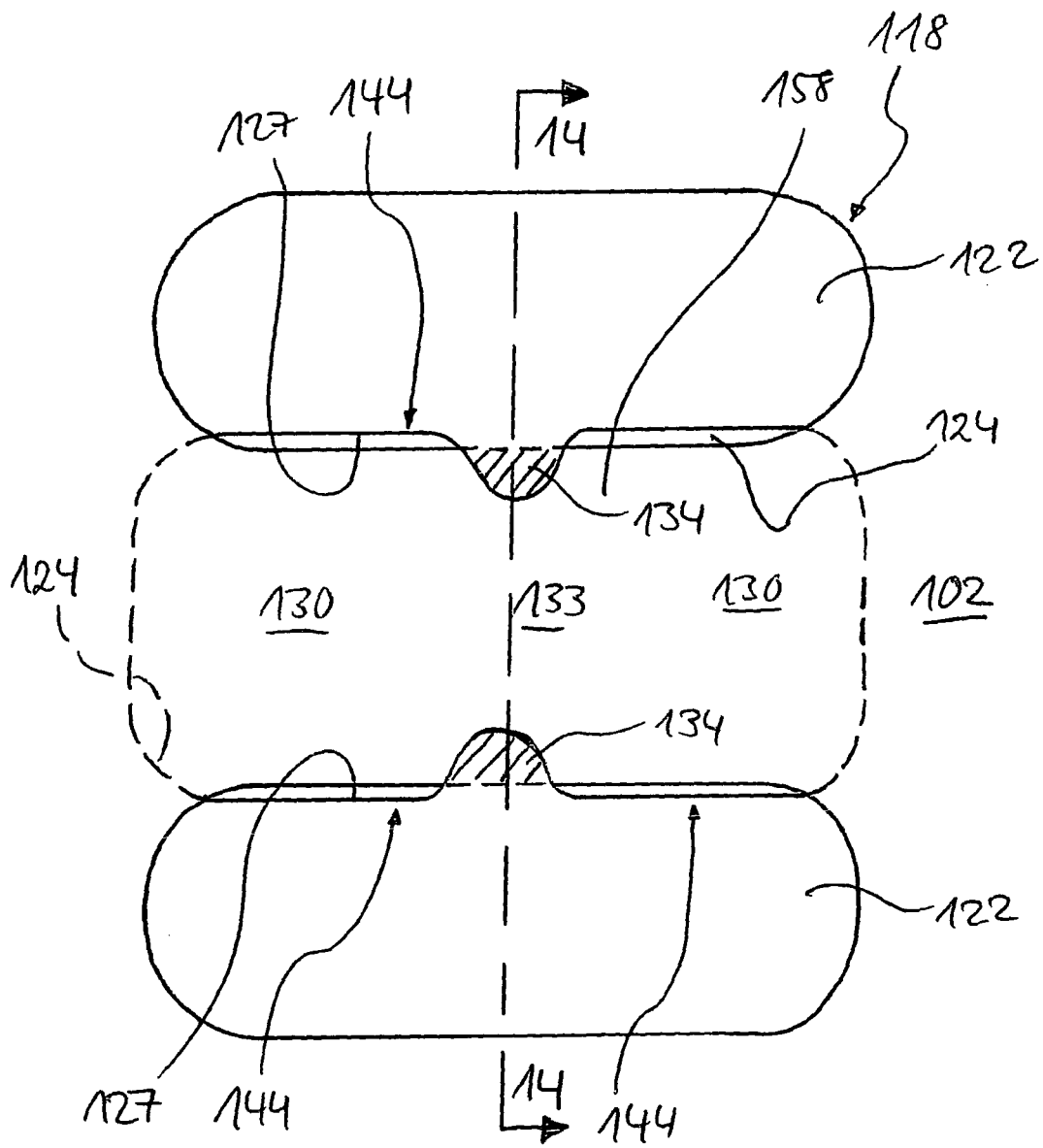
Figure 14:
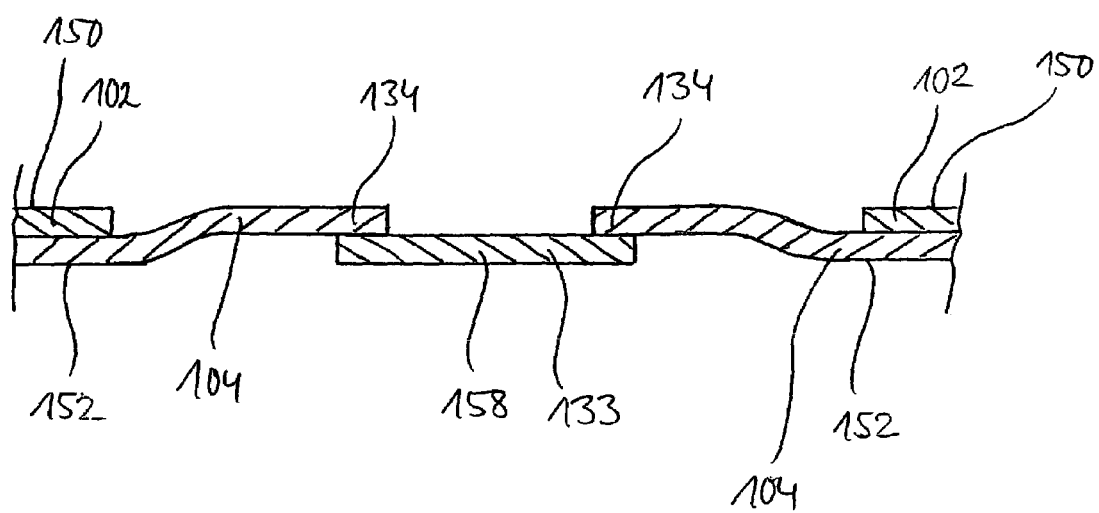

In the drawings:

FIG. 1 shows a schematic top view of a multi-layer flat gasket;

FIG. 2 an enlarged illustration of the region I in FIG. 1;

FIG. 3 a schematic section along the line 3—3 in FIG. 2;

FIG. 4 a schematic section along the line 4—4 in FIG. 2;

FIG. 5 a schematic top view of a first layer of the gasket shown FIGS. 1 to including a stamped-free retaining element;

FIG. 6 a top view of a second layer of the gasket shown in FIGS. 1 to 4 including a stamped out through opening;

FIG. 7 a schematic section along the line 3—3 in FIG. 2 prior to the retaining element being pressed through the through opening in the second layer;

FIG. 8 a schematic section along the line 4—4 in FIG. 2, during the process of pressing the retaining element through the through opening in the second layer;

FIG. 9 a schematic top view of a second embodiment of a connecting arrangement;

FIG. 10 a schematic section along the line 10—10 in FIG. 9;

FIG. 11 a schematic top view of the first layer of the gasket including a retaining web that has been stamped-free between two through openings;

FIG. 12 a schematic top view of a through opening that has been stamped out of the second layer;

FIG. 13 a schematic top view of a third embodiment of a connecting arrangement;

FIG. 14 a schematic section along the line 14—14 in FIG. 13; and

Figure 15:
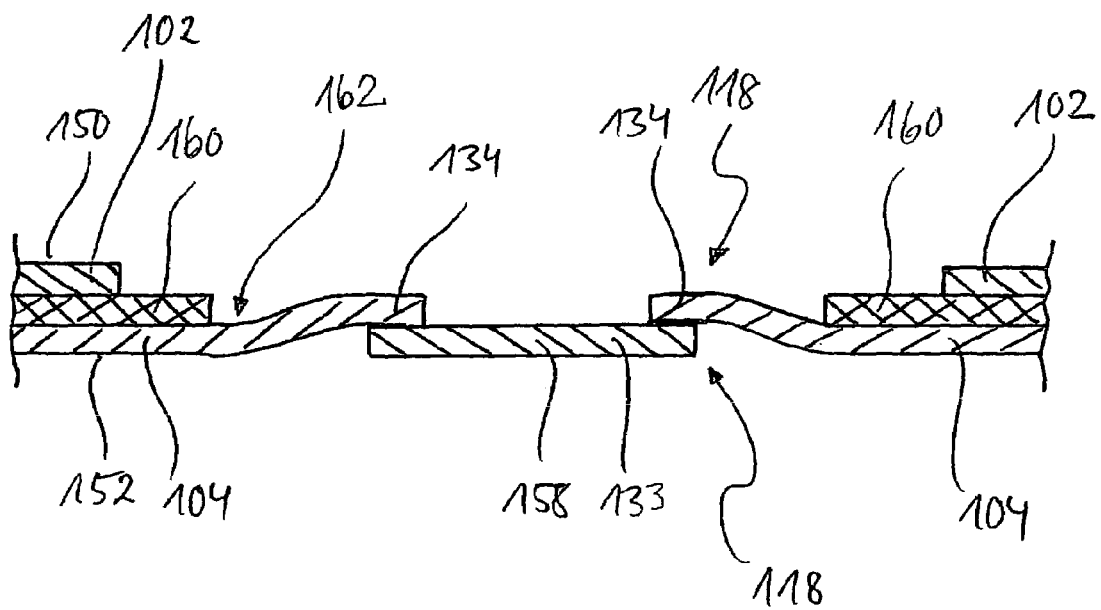

FIG. 15 a schematic section corresponding to FIG. 14 through a three-layer gasket having a connecting arrangement corresponding to the third embodiment.

Similar or functionally equivalent elements are provided with the same reference symbols in each of the Figures.

A flat gasket bearing the general reference 100 is illustrated in FIGS. 1 to 8 and, as can best be seen from FIGS. 3 and 4, it comprises two superimposed layers, namely a first layer 102 and a layer 104 which is arranged therebelow and rests flatly on the first layer 102.

The layers 102 and 104 preferably consist of an elastic metallic material, in particular, a spring steel sheet, and they may be provided with a coating, in particular, a coating of an elastomer such as nitrile butadiene rubber (NBR) for example.

Each of the layers 102, 104 is in the form of a substantially flat plate in which through openings that will be described in more detail hereinafter are formed by a stamping process.

The flat gasket 100 is intended to be arranged between two (not illustrated) elements requiring sealing such as an engine block and a cylinder head for example, whereby the flat gasket 100 is provided with fluid passage channels 106 which are formed in the first layer 102 and in the second layer 104 by means of mating fluid-channel through-openings 108 in order to enable a fluid to flow through the flat gasket 100 (see FIG. 1).

In this description and in the accompanying claims, a fluid should be understood as being any fluid medium including liquids and gases.

In order to improve the sealing of the fluid channels 106, they may be surrounded by annular (not illustrated) beadings which are formed in the first layer 102 and/or in the second layer 104.

The two components between which the flat gasket 100 is arranged are clamped together with the aid of suitable securing means, such as cylinder head bolts and nuts arranged thereon for example, in order to produce the pressure required for achieving an adequate sealing effect.

For the purposes of accommodating these securing means, the flat gasket 100 is provided with a plurality, eight for example, of channels 110 for the securing means which are formed by mating through openings 112 in the first layer 102 and the second layer 104 which form the respective channels for the securing means.

The portion of the flat gasket 100 located between the channels 110 for the securing means forms a compressed region 116 of the flat gasket 100.

Within the compressed region 116, the flat gasket 100 is provided with a plurality, four for example, of connecting arrangements 118 for connecting the two layers of the flat gasket 100 together, the construction of these arrangements being described in more detail hereinafter with reference to FIGS. 2 to 4.

As can be seen from FIG. 2, each of the connecting arrangements 118 comprises a retaining tongue 120 which is connected in one-piece manner to the metallic plate of the first layer 102, the outer contour thereof having been stamped free from the first layer 102 by stamping out a substantially U-shaped through opening 122.

The retaining tongue 120 is substantially mirror symmetrical about a longitudinal axis 128 which simultaneously forms a longitudinal axis of the connecting arrangement 118.

Furthermore, the connecting arrangement 118 comprises a through opening 124 which is stamped out from the second layer 104 and is substantially rectangular in shape having rounded corner regions 126.

The long sides 127 of the through opening 124 in the second layer 104 extend in parallel relative to a mirror plane of the through opening 124 and in parallel relative to a longitudinal axis 128' of the through opening 124 which is parallel to the longitudinal axis 128.

The retaining tongue 120 comprises a connecting section 130 which is fixed to the metallic plate of the first layer 102 and comprises two edges 132 which are substantially parallel relative to one another and to the longitudinal direction 128. These edges 132 are spaced from one another by a distance which is less than the mutual spacing between the long sides 127 of the through opening 124 in the second layer 104.

At the end (the right-hand end in FIG. 2) of the connecting section 130, an overlapping area 134 (indicated by the hatching in FIG. 2) projects out from each edge 132 of the connecting section 130 and extends laterally beyond the respective edge 132.

The part of the retaining tongue located between the overlapping areas 136 will be referred to hereinafter as the central section 133 of the retaining tongue 120.

The peak points 136, at which the overlapping areas 134 are at their greatest distance from the longitudinal axis 128 of the retaining tongue 120, are spaced from one another by a distance which exceeds the spacing between the long sides 127 of the through opening 124 in the second layer 104.

The two edges 140 of the retaining tongue 120 extend towards one another—symmetrically relative to the longitudinal axis 128—from the peak points 136 of the overlapping areas 134 thereby forming a tapering region 138 in which the retaining tongue 120 tapers.

The end of the retaining tongue 120 remote from the connecting section 130 is formed by a rounded end section 142 whose curved edge connects the two converging edges 140 of the tapering section 138 together.

The connecting section 130 of the retaining tongue 120 penetrates the through opening 124 in the second layer 104 so that the overlapping areas 134, the tapering section 138 and the end section 142 of the retaining tongue 120 are bent out of the plane of the first layer 102 into the plane of the second layer 104 (see FIGS. 3 and 4), namely, such that the overlapping areas 134 of the retaining tongue 120 each engage from behind a lateral edge region 144 of the through opening 124 in the second layer 104.

Within the framework of this description and the claims, the phrase "edge region" of a through opening should be understood as meaning a region of the layer in which the through opening is formed that is located close to the edge of the relevant through opening.

Due to the fact that the lateral overlapping areas 134 of the retaining tongue 120 engage from behind the lateral edge regions 144 of the through opening 124 in the second layer 104, the first layer 102 and the second layer 104 are safeguarded, due to the interlocking arrangement thereof, against a separating movement of these layers in a direction perpendicular to the main surfaces of the layers.

The lateral edge regions 144 thus form retention areas 146 in the second layer 104 which hold the retaining tongue 120 in its position bent into the plane of the second layer 104.

The retaining tongue 120 forms a retaining element 148 of the first layer 102 which grips behind the retention area 146 of the second layer 104.

As can be seen from FIGS. 3 and 4, the lateral edge regions 144 of the through opening 124 are bent out from the plane of the second layer 104 into the plane of the first layer 102 of the flat gasket 100.

The upper faces of these lateral edge regions 144 are substantially flush with the upper face 150 of the first layer 102 outside the connecting arrangement 118.

The lower faces of the central section 133, the tapering section 138 and the end section 142 of the retaining tongue 120 are substantially flush with the lower face 152 of the second layer 104 outside the connecting arrangement 118.

Due to the fact that the edge surfaces of the connecting arrangement 118 are substantially flush with the edge surfaces of the layers 102 and 104 of the flat gasket 100 (i.e. with the respective upper faces 150 and the lower faces 152 thereof outside the connecting arrangement 118), the connecting arrangement 118 does not produce any spread of material so that this connecting arrangement 118 can be arranged directly within the compressed region 116 of the flat gasket 100.

At the position at which the retaining tongue 120 penetrates the through opening 124 in the second layer 104 and thus an edge 132 of the connecting section 130 of the retaining tongue 120 on the one hand and an opposed long side 127 of the through opening 124 are at the same height, the edge 132 of the retaining tongue 120 and the edge of the through opening 124 are spaced apart by a distance d in a direction perpendicular relative to the longitudinal axis 128 of the connecting arrangement 118 (see FIG. 2). The two layers 102 and 104 can thus be pushed towards one another in the direction perpendicular to the longitudinal axis 128 by at most the amount +/−d.

As can be perceived from FIG. 1, the longitudinal axis 128 of the connecting arrangement 118a arranged above and to the left on the flat gasket 100 (in the illustration of FIG. 1) is aligned in the positive x-direction i.e. in parallel with the long sides 154 of the flat gasket 100.

The longitudinal axis 128 of the connecting arrangement 118b arranged above and to the right on the flat gasket 100 is aligned in the negative y-direction i.e. in parallel with the short sides 156 of the flat gasket 100.

The longitudinal axis 128 of the connecting arrangement 118c arranged below and to the right on the flat gasket 100 is aligned in the negative x-direction i.e. in parallel with the long sides 154 of the flat gasket 100.

The longitudinal axis 128 of the connecting arrangement 118d arranged below and to the left on the flat gasket 100 is aligned in the positive y-direction i.e. in parallel with the short sides 156 of the flat gasket 100.

Thus, the connecting arrangements 118a and 118c limit the relative amount by which the two layers 102 and 104 of the flat gasket 100 can be displaced in the y-direction to +/−d, whilst the connecting arrangements 118b and 118d limit the relative amount by which the two layers 102 and 104 of the flat gasket 100 can be displaced in the x-direction to +/−d.

Due to the fact that the flat gasket 100 comprises two groups of connecting arrangements 118 wherein the longitudinal axes 128 of the first group (the connecting arrangements 118a, 118c) are rotated relative to the longitudinal axes of the second group (118b, 118d) of connecting arrangements through an angle of approximately 90°, it is ensured that the relative amount by which the two layers 102 and 104 of the flat gasket 100 can be displaced is limited in each direction and consequently, the two layers 102 and 104 of the flat device 100 are precisely positioned relative to one another within the tolerance determined by the distance d.

The method of producing the previously described connecting arrangement 118 will be explained hereinafter with reference to FIGS. 5 to 8:

Firstly, the through opening 122 in the first layer 102 of the flat gasket 100 is produced by stamping it out from this layer.

As can be perceived from FIG. 5, the retaining tongue 120, which is formed in one piece with the remaining parts of the first layer 102, remains between the legs of the U-shaped through opening 122.

The through opening 124 in the second layer 104 is produced by stamping it out from the second layer 104 (FIG. 6).

Thereafter, the first layer 102 and the second layer 104 are positioned above one another in such a manner that the longitudinal axis 128 of the retaining tongue 120 is aligned in parallel with the longitudinal axis 128' of the through opening 124 and is precisely positioned thereabove and such that the overlapping areas 134 of the retaining tongue 120 are arranged above the lateral edge regions 144 of the through opening 124.

In this still unconnected position of the two layers 102 and 104 which is illustrated in the form of a sectional view in FIG. 7, the overlapping areas 134 of the retaining tongue 120 overlap the lateral edge regions 144 of the through opening 124 in the second layer 104, as seen in the plan view of the layers 102 and 104 from above.

The retaining tongue 120 incorporating the overlapping areas 134 is then pressed through the through opening 124 in the second layer 104 by means of a (not illustrated) push-through plunger into the position illustrated in FIG. 8 in which the central section 133, the tapering section 138 and the end section 142 of the retaining tongue 120 are arranged below the second layer 104.

In the course of this push-through process, the overlapping areas 134 of the retaining tongue 120 are bent upwardly to such an extent that the retaining tongue 120 can pass through the through opening 124 in the second layer 104 (the through opening 124 being narrower than the retaining tongue 120 in the vicinity of the overlapping areas 34).

This deformation of the overlapping areas 134, which occurs whilst the retaining tongue 120 is being pushed through, is effected at least partially elastically so that the overlapping areas 134 will move back at least partially into their original position relative to the central section 133 of the retaining tongue 120 after they have passed by the lateral edge regions 144 of the through opening 124 and consequently will again overlap the lateral edge regions 144 of the through opening 124 as seen in the top view of the main surfaces of the gasket layers, but now from below.

In a last step of the method, the central section 133, the overlapping areas 134, the tapering section 138 and the end section 142 of the retaining tongue 120 are pressed into the plane of the second layer 104 by means of a (not illustrated) pressure ram whereby the lateral edge regions 144 of the through opening 124 in the second layer 104 are deformed into the plane of the first layer 102 so that configuration of the connecting arrangement 118 illustrated in FIGS. 2 to 4 is achieved.

As an alternative or in addition to the use of a pressure ram, provision could also be made for the retaining element 148 to initially project beyond the lower face 152 of the second layer 104 and only be deformed into the plane of the second layer 104 during the assembly of the gasket.

The production of the connecting arrangement 118 is thus terminated.

A second embodiment of a connecting arrangement 118 that is illustrated in FIGS. 9 and 10 differs from the first embodiment described hereinabove in that the retaining element 148 is not in the form of a retaining tongue 120 that is connected to the first layer 102 at just one end, but is in the form of a retaining web 158 that is connected at both ends to the first layer 102.

The retaining web 158 comprises neither a tapering section 138 nor an end section 142 but rather, a respective connecting section 130 having two mutually parallel edges 132 at each end of the central section 133.

A respective overlapping area 134, which is depicted by the hatching in FIG. 9, projects laterally between the edges 132 of the two connecting sections 130 at each side of the retaining web 158.

The spacing between the two peak points 136 of the overlapping areas 134 exceeds the spacing between the two long sides 127 of the through opening 124 in the second layer 104.

The overlapping areas 134 engage from behind the lateral edge regions 144 of the through opening 124 in the second layer 104 so that the first layer 102 and the second layer 104 are safeguarded against a separating movement of these layers in a direction perpendicular to their main surfaces by virtue of the interlocking arrangement.

At the positions at which a respective edge 132 of a connecting section 130 and one of the long sides 127 of the through opening 124 are opposed, the mutual spacing between the retaining web 158 on the one hand and the lateral edge regions 144 of the through opening 124 on the other amounts to d so that the relative degree of movement between the two layers 102 and 104 and the retaining web 158 in a direction perpendicular to the longitudinal axis 128 of the connecting arrangement 118 is restricted to +/−d.

The lower face of the central section 133 of the retaining web 158 is substantially flush with the lower face 152 of the second layer 104 outside the connecting arrangement 118, and the upper face of the lateral edge regions 144 of the through opening 124 is substantially flush with the upper face 150 of the first layer 102 outside the connecting arrangement 118 so that the edge surfaces of the connecting arrangement 118 are substantially flush with the edge surfaces of the layers 102 and 104 of the flat gasket and the connecting arrangement 118 does not produce a spread of material so that in consequence the connecting arrangement 118 can be arranged directly within the compressed region 116 of the flat gasket 100.

The method of producing the second embodiment of a connecting arrangement runs in analogous manner to the method of producing the first embodiment and will be explained hereinafter with reference to FIGS. 11 and 12:

Initially, two substantially oval through openings 122, which are disposed and formed symmetrically relative to the longitudinal axis 128 of the retaining web 158, are produced in the first layer 102 by stamping them out from the first layer 102, the retaining web 158 remaining therebetween.

The through opening 124 in the second layer 104, which extends to a greater extent in a direction perpendicular to the longitudinal axis 128' thereof than the connecting section 130 of the retaining web 158, is produced by stamping it out from the second layer 104.

Thereafter the first layer 102 and the second layer 104 are positioned above one another in such a manner that the longitudinal axis 128 of the retaining web 158 is aligned in parallel relative to the longitudinal axis 128' of the through opening 124 in the second layer 104 and is precisely positioned thereabove, and such that the overlapping regions 134 of the retaining web 158 are arranged above the lateral edge regions 144 of the through opening 124.

Then the retaining web 158 is pressed through the through opening 124 in the second layer 104 by means of a (not illustrated) push-through plunger, whereby the overlapping areas 134 will be deformed upwardly in an at least partially elastic manner in order to enable the retaining web 158 to pass by the edge regions 144 of the through opening 124.

After passing through the through opening 124, the overlapping areas 134 revert at least partially into their original position relative to the central section 133 of the retaining web 158 so that the overlapping areas 134 will now engage from behind the lateral edge regions 144 of the through opening 124 from below and consequently will prevent a return movement of the retaining web 158 through the through opening 124 so that the two layers 102 and 104 of the flat gasket 100 will be safeguarded against a separating movement thereof in a direction perpendicular to the main surfaces of the gasket layers due to the interlocking arrangement.

Thereafter, the retaining web 158 is pressed into the plane of the second layer 104 by means of a (not illustrated) pressure ram whereby the second layer 104 will be simultaneously deformed in such a manner that the lateral edge regions 144 of the through opening 124 will be deformed into the plane of the first layer 102.

As an alternative or in addition thereto, the deformation of the retaining web 158 into the plane of the second layer 104 need only occur when the gasket is being assembled, the deformation then being produced by the action of clamping together the components between which the gasket is arranged.

The production of the second embodiment of a connecting arrangement 118 is thus terminated.

A third embodiment of a connecting arrangement 118 differs from the second embodiment described hereinabove in that the overlapping areas 134 are not arranged on the retaining web 158 but rather, on the second layer 104, and they project from the long sides 127 of the through opening 124 (see FIG. 13).

In this embodiment, the retaining web 158 is of substantially constant width in the connecting sections 130 and the central section 133.

In order to produce this connecting arrangement 118, the first layer 102 and the second layer 104 are positioned above one another in such a manner that the longitudinal axis 128 of the retaining web 158 is aligned in parallel with the longitudinal axis 128' of the through opening 124 and is precisely positioned thereabove, and such that the overlapping areas 134 of the second layer 104 overlap the edge regions of the central section 133 of the retaining web 158 from below.

Thereafter, the retaining web 158 is pressed through the through opening 124 in the second layer 104 by means of a (not illustrated) push-through plunger, whereby the overlapping areas 134 of the second layer 104 are deformed downwardly in an at least partially elastic manner which is such that the retaining web 158 can pass between the overlapping areas 134.

After the passage of the retaining web 158, the overlapping areas 134 move at least partially back into position so that they will again overlap the edge regions of the central section 133 of the retaining web 158, but in this case, from above.

In a last step of the method, the retaining web 158 is pressed into the plane of the second layer 104 by means of a (not illustrated) pressure ram, whereby the overlapping areas 134 of the second layer 104 are deformed into the plane of the first layer 102 so that the configuration of the connecting arrangement 118 illustrated in FIGS. 13 and 14 is obtained.

The production of the connecting arrangement 118 is thereby terminated.

In this embodiment, the upper face of the overlapping areas 134 of the second layer 104 are substantially flush with the upper face 150 of the first layer 102 outside the connecting arrangement 118, and the lower face of the retaining web 158 is substantially flush with the lower face 152 of the second layer 104 outside the connecting arrangement 118 so that the edge surfaces of the connecting arrangement 118 are substantially flush with the edge surfaces of the layers 102 and 104 of the flat gasket 100, and the connecting arrangement 118 does not produce a spread of material, for which reason the connecting arrangement 118 can be directly arranged within the compressed region 116 of the flat gasket 100.

A fourth embodiment of a connecting arrangement 118 that is illustrated in FIG. 15 differs from the previously described third embodiment in that in that a further layer 160 of the flat gasket 100 is provided between the first layer 102 and the second layer 104, this further layer being arranged between the first layer 102 and the second layer 104 and comprising a through opening 162 which is of greater width than the through opening 124 in the second layer 104 so that the retaining web 158 of the first layer 102 can be moved without encountering resistance through the through opening 162 in the further layer 160 when producing the connecting arrangement 118.

In the case of the fourth embodiment of a connecting arrangement 118, the upper face of the overlapping areas 134 of the second layer 104 is not flush with the upper face 150 of the first layer, but is lower than the upper face 150 of the first layer 102. Nonetheless, the connecting arrangement 118 does not produce a spread of material so that the connecting arrangement 118 can be arranged directly in the compressed region 116 of the flat gasket 100.

Otherwise, the fourth embodiment of a connecting arrangement 118 is equivalent to that of the third embodiment as regards its construction and functioning so that reference may be made to the preceding description in connection therewith.

The invention claimed is:

1. A multi-layer gasket which comprises at least one first layer and one second layer and a plurality of connecting arrangements for connecting the first layer and second layer of the gasket together, wherein each connecting arrangement comprises at least one retaining element connected to one of the first layer or second layer and at least one through opening disposed in the other of the first layer or second layer, wherein each retaining element and a respective retention area adjoining the respective through opening of each of the connecting arrangements partially overlap one another in an unconnected state of the first layer and second layer, wherein, for the purposes of connecting the first layer and second layer, each retaining element is deformable from a plane of the one of the first layer and second layer to which it is connected in such a manner that it is moved to penetrate the respective through opening past the respective retention area wherein the retaining element of at least one of the connecting arrangements comprises a one-piece retaining tongue connected at one end to one of the first layer or second layer, said retaining tongue having at least two mutually spaced overlapping areas which overlap respective retention areas of the adjoining through opening in the unconnected state of the first layer and second layer and deform during the movement of the retaining tongue past the retention areas in such a manner that the retaining tongue can be moved past the retention areas, wherein each retaining element grips behind the respective retention area in a connected state of the first layer and second layer in such a manner that the first layer and the second layer are safeguarded from a separating movement thereof, and wherein an edge of the retaining element of one of the connecting arrangements extends in a first retaining element edge direction where that retaining element penetrates the respective through opening and an edge of the retaining element of another of the connecting arrangements extends in a second retaining element edge direction where that retaining element penetrates the respective through opening, said first retaining element edge direction and said second retaining element edge direction being mutually rotated relative to one another.

2. A gasket in accordance with claim 1, wherein the overlapping area is in the form of a projection at the edge of the retaining element.

3. A gasket in accordance with claim 1, wherein the retaining tongue tapers towards a tip thereof.

4. A gasket in accordance with claim 1, wherein the retaining element of at least one of the connecting arrangements is deformed into a plane of the other of the first layer or second layer with which it is unconnected.

5. A gasket in accordance with claim 1, wherein the retention area of least one of the connecting arrangements is deformed from a plane of the other of the first layer or second layer into the plane of the one of the first layer or second layer, or, into the plane of a layer of the gasket that is arranged between the first layer and the second layer.

6. A gasket in accordance with claim 1, wherein a surface of the retaining element of least one of the connecting arrangements is substantially flush with an edge surface of the gasket in the assembled state of the gasket.

7. A gasket in accordance with claim 1, wherein a surface of the retention area of at least one of the connecting arrangements is substantially flush with an edge surface of the gasket in the assembled state of the gasket.

8. A gasket in accordance with claim 1, wherein a least one of the connecting arrangements is arranged in a region of the gasket which is compressed in the assembled state of the gasket.

9. A gasket in accordance with claim 1, wherein the retaining element is formed by producing at least one opening in one of the first layer or second layer.

10. A gasket in accordance with claim 9, wherein the retaining element of at least one of the connecting arrangements is formed by a stamping-out or a cutting-out of said at least one opening in one of the first layer and second layer.

11. A gasket in accordance with claim 1, wherein the edge of the retaining element and the edge of the respective through opening of at least one of the connecting arrangements are spaced apart at the point at which the retaining element penetrates the respective through opening by a distance (d) which is less than approximately 1 millimeter.

12. A gasket in accordance with claim 11, wherein the distance (d) is less than approximately 0.5 millimeter.

13. A gasket in accordance with claim 1, wherein the first retaining element edge direction and the second retaining element edge direction are mutually rotated through an angle of at least approximately 45°.

14. A gasket in accordance with claim 13, wherein the first retaining element edge direction and the second retaining element edge direction are mutually rotated through an angle 6f at least approximately 60°.

15. A gasket in accordance with claim 14, wherein the first retaining element edge direction and the second retaining element edge direction are mutually rotated through an angle of at least approximately 90°.

16. A method of connecting together the layers of a multi-layer gasket, which comprises at least one first layer and one second layer, comprising the following method steps:

forming a plurality of connecting arrangements each having a retaining element connected to one of the first layer or second layer and a respective through opening in the other of the first layer or second layer, wherein each retaining element and a respective retention area adjoining the respective through opening partially overlap one another in an unconnected state of the first layer and second layer, wherein the retaining element of at least one of the connecting arrangements comprises a one-piece retaining tongue connected at one end to one of the first layer or second layer, said retaining tongue having at least two mutually spaced overlapping areas which overlap respective retention areas of the adjoining through opening in the unconnected state of the first layer and second layer and deform during the movement of the retaining tongue past the retention areas in such a manner that the retaining tongue can be moved past the retention areas;

deforming each retaining element from the plane of the one of the first layer or second layer to which it is connected in such a manner that it is moved to penetrate the respective through opening past the respective retention area including deforming said retaining tongue in such a manner, that the retaining tongue is moved past the retention areas, and, after this passing movement, to grip behind the respective retention area in such a manner that the first layer and the second layer are safeguarded from a separating movement thereof; and wherein an edge of the retaining element of one of the connecting arrangements extends in a first retaining element edge direction where that retaining element penetrates the respective through opening and an edge of the retaining element of another of the connecting arrangements extends in a second retaining element edge direction where that retaining element penetrates the respective through opening, said first retaining element edge direction and said second retaining element edge direction being mutually rotated relative to one another.

17. A method in accordance with claim 16, wherein the overlapping area is formed as a projection at the edge of the retaining element.

18. A method in accordance with claim 16, wherein the retaining tongue is formed in such a manner that it tapers towards a tip thereof.

19. A method in accordance with claim 18, wherein the retaining element of least one of the connecting arrangements is deformed into a plane of the other of the first layer or second layer to which it is unconnected.

20. A method in accordance with claim 16, wherein the retention area of least one of the connecting arrangements is deformed from a plane of the other of the first layer or second layer into the plane of the one of the first layer or second layer, or, into the plane of a layer of the gasket that is arranged between the first layer and the second layer.

21. A method in accordance with claim 16, wherein at least one of the connecting arrangements is formed in such a manner that a surface of its retaining element is substantially flush with an edge surface of the gasket in the assembled state of the gasket.

22. A method in accordance with claim 16, wherein at least one of the connecting arrangements is formed in such a manner that a surface of its retention area is substantially flush with an edge surface of the gasket in the assembled state of the gasket.

23. A method in accordance with claim 16, wherein at least one of the connecting arrangements is formed in a region of the gasket which is compressed in the assembled state of the gasket.

24. A method in accordance with claim 16, wherein the retaining element of at least one of the connecting arrangements is formed by producing at least one opening in one of the first layer or second layer.

25. A method in accordance with claim 24, wherein the retaining element of at least one of the connecting arrangements is formed by a stamping-out or cutting-out of said at least one opening in one of the first layer or second layer.

26. A method in accordance with claim 16, wherein the retaining element and the respective through opening of at least one of the connecting arrangements are formed in such a manner that the edge of the retaining element and the edge of the respective through opening are spaced apart at the point at which the retaining element penetrates the respective through opening by a distance (d) which is less than approximately 1 millimeter.

27. A method in accordance with claim 26, wherein the distance (d) is less than approximately 0.5 millimeter.

28. A method in accordance with claim 16, wherein the first retaining element edge direction and the second retaining element edge direction are mutually rotated through an angle of at least approximately 45°.

29. A method in accordance with claim 28, wherein the first retaining element edge direction and the second retaining element edge direction are mutually rotated through an angle of at least approximately 60°.

30. A method in accordance with claim 29, wherein the first retaining element edge direction and the second retaining element edge direction are mutually rotated through an angle of at least approximately 90°.

31. A multi-layer gasket which comprises at least one first layer and one second layer and a plurality of connecting arrangements for connecting the first layer and second layer of the gasket together, wherein each connecting arrangement comprises at least one retaining element connected to one of the first layer or second layer and at least one through opening disposed in the other of the first layer or second layer, wherein each retaining element and a respective retention area adjoining the respective through opening of each of the connecting arrangements partially overlap one another in an unconnected state of the first layer and second layer, wherein, for the purposes of connecting the first layer and second layer, each retaining element is deformable from a plane of the one of the first layer and second layer to which it is connected in such a manner that it is moved to penetrate the respective through opening past the respective retention area, wherein each retaining element grips behind the respective retention area in a connected state of the first layer and second layer in such a manner that the first layer and the second layer are safeguarded from a separating movement thereof, and wherein an edge of the retaining element of one of the connecting arrangements extends in a first retaining element edge direction where that retaining element penetrates the respective through opening and an edge of the retaining element of another of the connecting arrangements extends in a second retaining element edge direction where that retaining element penetrates the respective through opening, said first retaining element edge direction and said second retaining element edge direction being mutually rotated relative to one another, wherein the retaining element of at least one of the connecting arrangements is in the form of a one-piece retaining web which is connected at both ends to one of the first layer or second layer.

32. A method of connecting together the layers of a multi-layer gasket, which comprises at least one first layer and one second layer, comprising the following method steps:

forming a plurality of connecting arrangements each having a retaining element connected to one of the first layer or second layer and a respective through opening in the other of the first layer or second layer, wherein each retaining element and a respective retention area adjoining the respective through opening partially overlap one another in an unconnected state of the first layer and second layer, wherein the retaining element of at least one of the connecting arrangements comprises a one-piece retaining web which is connected at both ends to one of the first layer or second layer;

deforming each retaining element from the plane of the one of the first layer or second layer to which it is connected in such a manner that it is moved to penetrate the respective through opening past the respective retention area including deforming said retaining web in such a manner that the retaining web is moved past the retention area, and, after this passing movement, to grip behind the respective retention area in such a manner that the first layer and the second layer are safeguarded from a separating movement thereof; and wherein an edge of the retaining element of one of the connecting arrangements extends in a first retaining element edge direction where that retaining element penetrates the respective through opening and an edge of the retaining element of another of the connecting arrangements extends in a second retaining element edge direction where that retaining element penetrates the respective through opening, said first retaining element edge direction and said second retaining element edge direction being mutually rotated relative to one another.

33. A multilayer gasket which comprises at least one first layer and one second layer and a plurality of connecting arrangements for connecting the first layer and second layer of the gasket together, wherein each connecting arrangement comprises at least one retaining element connected to one of the first layer or second layer and at least one through opening disposed in the other of the first layer or second layer, wherein each retaining element and a respective retention area adjoining the respective through opening of each of the connecting arrangements partially overlap one another in an unconnected state of the first layer and second layer, wherein, for the purposes of connecting the first layer and second layer, each retaining element is deformable from a plane of the one of the first layer and second layer to which it is connected in such a manner that it is moved to penetrate the respective through opening past the respective retention area wherein at least one of the connecting arrangements includes at least two mutually spaced retention areas each of which overlaps the same one-piece retaining element at at least one overlapping area thereof in the unconnected state of the first layer and second layer and each of which deforms during movement of the retaining element past the retention areas in such a manner that the retaining element can be moved past the retention areas, wherein each retaining element grids behind the respective retention area in a connected state of the first layer and second layer in such a manner that the first layer and the second layer are safeguarded from a separating movement thereof, and wherein an edge of the retaining element of one of the connecting arrangements extends in a first retaining element edge direction where that retaining element penetrates the respective through opening and an edge of the retaining element of another of the connecting arrangements extends in a second retaining element edge direction where that retaining element penetrates the respective through opening, said first retaining element edge direction and said second retaining element edge direction being mutually rotated relative to one another.

34. A gasket in accordance with claim 33, wherein the overlapping area is in the form of a projection at the edge of the respective through opening.

35. A gasket in accordance with claim 33, wherein the retaining element of at least one of the connecting arrangements is in the form of a retaining web which is connected at both ends to one of the first layer or second layer.

36. A gasket in accordance with claim 33, wherein the retaining element of at least one of the connecting arrangements is formed in one piece with one of the first layer or second layer.

37. A method of connecting together the layers of a multi-layer gasket, which comprises at least one first layer and one second layer, comprising the following method steps:

forming a plurality of connecting arrangements each having a retaining element connected to one of the first layer or second layer and a respective through opening in the other of the first layer or second layer, wherein each retaining element and a respective retention area adjoining the respective through opening partially overlap one another in an unconnected state of the first layer and second layer, wherein at least one of the connecting arrangements includes at least two mutually spaced retention areas each of which overlaps the same one-piece retaining element at at least one overlapping area thereof in the unconnected state of the first layer and second layer;

deforming each retaining element from the plane of the one of the first layer or second layer to which it is connected in such a manner that it is moved to penetrate the respective through opening past the respective retention area including deforming said at least two retention areas in such a manner that the retaining element is moved past the retention areas, and, after this passing movement, to grip behind the respective retention area in such a manner that the first layer and the second layer are safeguarded from a separating movement thereof; and wherein an edge of the retaining element of one of the connecting arrangements extends in a first retaining element edge direction where that retaining element penetrates the respective through opening and an edge of the retaining element of another of the connecting arrangements extends in a second retaining element edge direction where that retaining element penetrates the respective through opening, said first retaining element edge direction and said second retaining element edge direction being mutually rotated relative to one another.

38. A method in accordance with claim 37, wherein the overlapping area is formed as a projection at the edge of the respective through opening.

39. A method in accordance with claim 37, wherein the retaining element of at least one of the connecting arrangements is formed as a retaining web which is connected at both ends to one of the first layer or second layer.

40. A method in accordance with claim 37, wherein the retaining element of least one of the connecting arrangements is formed in one piece with one of the first layer or second layer.

* * * * *

UNITED STATES PATENT AND TRADEMARK OFFICE
CERTIFICATE OF CORRECTION

| | |
|---|---|
| PATENT NO. | : 7,059,610 B2 |
| APPLICATION NO. | : 10/419648 |
| DATED | : June 13, 2006 |
| INVENTOR(S) | : Oliver Hegmann |

It is certified that error appears in the above-identified patent and that said Letters Patent is hereby corrected as shown below:

Column 13, line 53 replace the word "6f" with --of--.

Column 14, line 18 remove "," between "manner" and "that".

Column 16, line 57 replace the word "grids" with --grips--.

Signed and Sealed this

Twenty-seventh Day of March, 2007

JON W. DUDAS
*Director of the United States Patent and Trademark Office*